(12) United States Patent
Fröberg Olsson et al.

(10) Patent No.: US 10,804,992 B2
(45) Date of Patent: Oct. 13, 2020

(54) METHOD AND APPARATUS FOR PROVIDING CHANNEL STATE INFORMATION STATUS BY A TRANSCEIVER

(71) Applicant: Telefonaktiebolaget LM Ericsson (publ), Stockholm (SE)

(72) Inventors: Jonas Fröberg Olsson, Ljungsbro (SE); Pål Frenger, Linköping (SE); Martin Hessler, Linköping (SE)

(73) Assignee: TELEFONAKTIEBOLGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/334,466

(22) PCT Filed: Sep. 23, 2016

(86) PCT No.: PCT/SE2016/050901
§ 371 (c)(1),
(2) Date: Mar. 19, 2019

(87) PCT Pub. No.: WO2018/056877
PCT Pub. Date: Mar. 29, 2018

(65) Prior Publication Data
US 2020/0127720 A1  Apr. 23, 2020

(51) Int. Cl.
*H04B 7/06* (2006.01)
*H04W 72/14* (2009.01)
*H04B 1/38* (2015.01)

(52) U.S. Cl.
CPC .......... *H04B 7/0626* (2013.01); *H04B 7/065* (2013.01); *H04B 7/0617* (2013.01); *H04W 72/14* (2013.01); *H04B 1/38* (2013.01)

(58) Field of Classification Search
None
See application file for complete search history.

(56) References Cited

U.S. PATENT DOCUMENTS 8,995,373 B2 *  3/2015  Yang ............... H04B 7/0626
                                                           370/329
2011/0069269 A1  3/2011  Chen et al.
(Continued)

FOREIGN PATENT DOCUMENTS

WO    2009038303 A1    3/2009

OTHER PUBLICATIONS

Unknown, Author, "Principles of CQI report", 3GPP TSG RAN2 #52, R2-0601021, Athens, Greece, Mar. 27-31, 2006, 1-4.
(Continued)

*Primary Examiner* — Brian S Roberts
(74) *Attorney, Agent, or Firm* — Murphy, Bilak & Homiller, PLLC

(57) ABSTRACT

In one aspect of this disclosure, a transceiver obtains and transmits a CSI status indicator. In one example, the CSI status indicator indicates that previously reported CSI is outdated and/or that a new CSI report is available at the transceiver. In some embodiments, the transceiver generates or transmits the CSI status indicator according to a particular configuration, which may be set by a supporting wireless communication network. The configuration may include criteria on when to transmit the CSI status indicator, such as configuration criteria indicating that the transceiver should transmit the CSI status indicator responsive to completing its determination of a full-dimension beamforming matrix to be used for controlling beamforming towards the transceiver. The transceiver comprises, for example, a wireless device operating within a wireless communication network and the CSI status indicator corresponds to the status of downlink CSI.

10 Claims, 4 Drawing Sheets

(56) References Cited

U.S. PATENT DOCUMENTS

| | | | |
|---|---|---|---|
| 2011/0069629 A1* | 3/2011 | Breit | H04B 7/0626 370/252 |
| 2013/0044624 A1* | 2/2013 | Su | H04L 1/0026 370/252 |
| 2015/0023194 A1* | 1/2015 | Seo | H04W 24/10 370/252 |
| 2016/0192350 A1* | 6/2016 | Yi | H04W 52/146 370/329 |
| 2016/0359538 A1* | 12/2016 | Onggosanusi | H04B 7/0469 |
| 2017/0366998 A1* | 12/2017 | Lee | H04B 7/0626 |

OTHER PUBLICATIONS

Unknown, Author, "Uplink control information", 3GPPRAN1 #2-NB-IoT, R1-161943, Sophia-Antipolis, France, Mar. 22-24, 2016, 1-3.

* cited by examiner

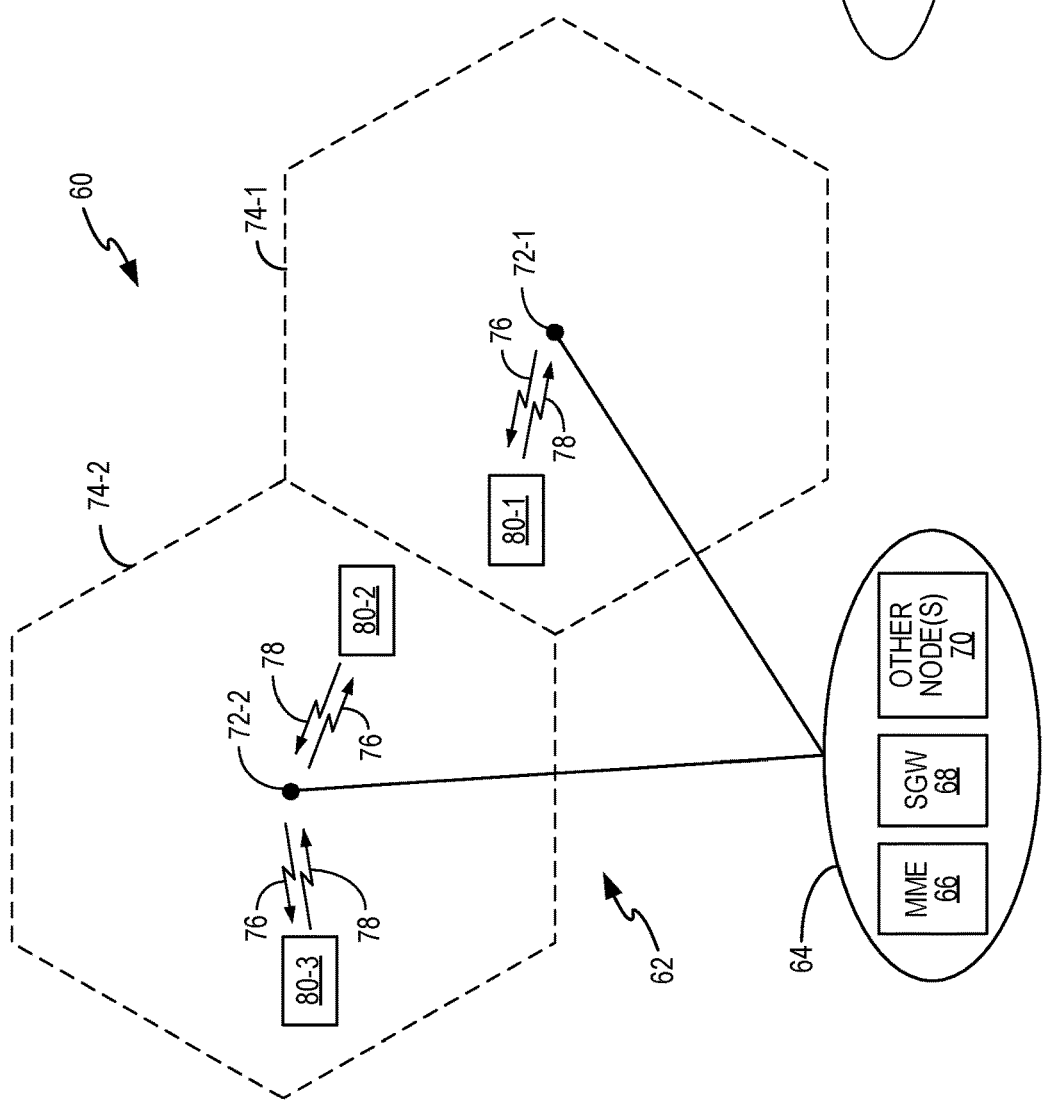
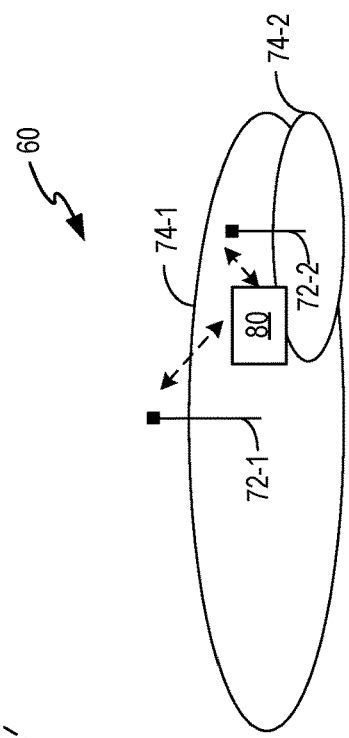
FIG. 3A
FIG. 3B

METHOD AND APPARATUS FOR PROVIDING CHANNEL STATE INFORMATION STATUS BY A TRANSCEIVER

TECHNICAL FIELD

The present invention relates to the radio signaling between transceivers, and particularly relates to a first transceiver providing Channel State Information (CSI) status indicators, e.g., for use by a second transceiver that beamforms toward the first transceiver.

BACKGROUND

The feedback of Channel State Information, CSI, from a transceiver is crucial for obtaining good performance in many types of wireless communication systems. Reference signals are transmitted for use in estimating the channel state. CSI feedback typically includes a Channel Quality Indicator, CQI, value and a Rank Indicator, RI, value. More detailed reports may include frequency-selective CQI or Pre-coding Matrix Indicator, PMI, values.

Networks based on the Long Term Evolution, LTE, specifications promulgated by the Third Generation Partnership Project, 3GPP, support CSI-reporting schemes that rely on reference symbols being transmitted periodically. In particular, an LTE base station transmits Cell-specific Reference Symbols, CRS, every subframe, while user-specific CSI-RS targeting a particular mobile terminal or other User Equipment (UE), may be sent with a longer periodicity. UEs using transmission mode 10, TM10, rely solely on CSI-RS resources, while other UEs typically use the CRS at least for interference measurements.

TM10 UEs can be configured to report CSI for multiple CSI processes, which each may have different CSI measurement resources. A CSI measurement resource consists of a CSI-RS resource and a CSI Interference Measurement, CSI-IM, resource. Both the CSI-RS and the CSI-IM resources are divided into sets of resources, where each set is identified by a CSI-RS configuration index. Here, the resources will be understood as referring to time/frequency resources in the OFDM grid defined in the LTE signal structure.

The CSI report may be sent on a Physical Uplink Shared Channel, PUSCH, resource when the UE has an uplink grant or otherwise is sent on the Physical Uplink Control Channel, PUCCH. The PUCCH represents a scarce resource. Consequently, transmissions of complex CSI reports such as frequency-selective PMI/CQI use PUSCH resources. The UE may be configured with a PUSCH CSI reporting mode and/or a PUCCH CSI reporting mode. The PUSCH CSI reporting mode is an aperiodic mode where the UE transmits CSI reports upon reception of a CSI request received in an uplink data grant. The PUCCH CSI reporting mode is a periodic mode where the UE is configured to transmit CSI reports periodically either on PUCCH or PUSCH.

It is recognized herein that the preceding convention raises certain issues with respect to future technologies. Consider, for example, "Massive MIMO" systems, where "MIMO" denotes Multiple-Input-Multiple-Output and where MIMO transmissions involve two or more transmit antennas and two or more receive antennas.

As a general proposition, future wireless access technologies are expected to support many more transmit antennas, and especially on the network side. In the context of Massive MIMO as an example, network-side transmissions may involve several hundred or even thousands of antennas. Here, it should be noted that these multiple antennas may comprise individual antenna elements within an array of antenna elements. Unless clarity is needed, this disclosure uses the term "antennas" to denote separate antennas or separate antenna elements within an array. Wireless devices operating in such systems also may use a relatively large number of antennas, particular for operation at higher carrier frequencies, because the shorter wavelengths allow for corresponding reductions in antenna size.

The increased number of antenna elements makes it possible to form more directive antenna patterns as compared to what is possible with contemporary antenna systems. A more capable antenna system can focus its transmitted and/or received signal more efficiently towards the device being served, while suppressing interference to or from other devices. Each such directional radiation pattern is typically referred to as a "beam" and the process of using directional beams for transmitting or receiving signals is referred to as "beamforming".

With the increasing number of antennas involved in transmissions, CSI reporting becomes costlier in both the downlink and the uplink. In downlink transmissions from the network to a device, the large number of antennas may require a large number of "ports", which can be viewed as the number of distinguishable CSI reference signals at the device. The number of ports hence determines the "dimension" of the downlink channel that the device can observe. For "full-dimension" or "explicit" CSI reporting, the number of ports equals the number of transmit antennas. Therefore, with a larger number of antennas, the downlink CSI reference signals will consume a larger amount of downlink resources.

Correspondingly, more computational resources are required at the reporting device to generate an explicit CSI report, and more uplink resources are needed to send the larger amount of data contained in an explicit CSI report. Whereas "explicit" CSI reports convey data explicitly characterizing the full channel, e.g., a complete set of beamforming matrix values corresponding to the full dimension of the channel, "implicit" CSI reports provide an abbreviated or coarse "picture" of the channel, via CQI, PMI, and RI values.

Of course, implicit CSI reporting is useful for addressing fast channel changes and the conventional periodic and aperiodic modes used for implicit CSI reporting reflect such usage. It is recognized herein, however, that conventional CSI reporting modes and associated reporting techniques are not well suited for explicit CSI reporting.

SUMMARY

In one aspect of this disclosure, a transceiver obtains and transmits a CSI status indicator. In one example, the CSI status indicator indicates that previously reported CSI is outdated and/or that a new CSI report is available at the transceiver. In some embodiments, the transceiver generates or transmits the CSI status indicator according to a particular configuration, which may be determined by a supporting wireless communication network. The configuration may include criteria on when to transmit the CSI status indicator, such as criteria indicating that the transceiver should transmit the CSI status indicator responsive to completing its determination of a full-dimension beamforming matrix to be used for controlling beamforming towards the transceiver. The transceiver comprises, for example, a wireless device operating within a wireless communication network and the CSI status indicator corresponds to the status of downlink CSI.

In an example embodiment, a method at a first transceiver comprises generating a CSI status indictor in dependence on a status of CSI generation at the first transceiver with respect to a channel between the first transceiver and a second transceiver that beamforms toward the first transceiver. The method further includes transmitting the CSI status indicator, receiving a transmission grant or request in response to the CSI status indicator, and transmitting a CSI report in response to the transmission grant or request.

In a further example, a first transceiver comprises transceiver circuitry configured to transmit and receive radio signals, and processing circuitry that is operatively associated with the transceiver circuitry. The processing circuitry is configured to generate a CSI status indictor in dependence on a status of CSI generation at the first transceiver with respect to a channel between the first transceiver and a second transceiver that beamforms toward the first transceiver. The processing circuitry is further configured to transmit, via the transceiver circuitry, the CSI status indicator. The processing circuitry is further configured to receive, via the transceiver circuitry, a transmission grant or request in response to the CSI status indicator, and transmit, via the transceiver circuitry, a CSI report in response to the transmission grant or request.

In yet another example, a first transceiver comprises one or more transmit/receive modules that are configured for receiving signals and transmitting signals, and one or more CSI processing/reporting modules that are configured to generate a CSI status indictor in dependence on a status of CSI generation at the first transceiver with respect to a channel between the first transceiver and a second transceiver that beamforms toward the first transceiver. The CSI processing/reporting module(s) are further configured to transmit the CSI status indicator, e.g., via the transmit/receive module(s), receive a transmission grant or request in response to the CSI status indicator, and transmit a CSI report in response to the transmission grant or request.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 3A and 3B are block diagrams of example embodiments of a wireless communication network.

DETAILED DESCRIPTION

Figure 1:
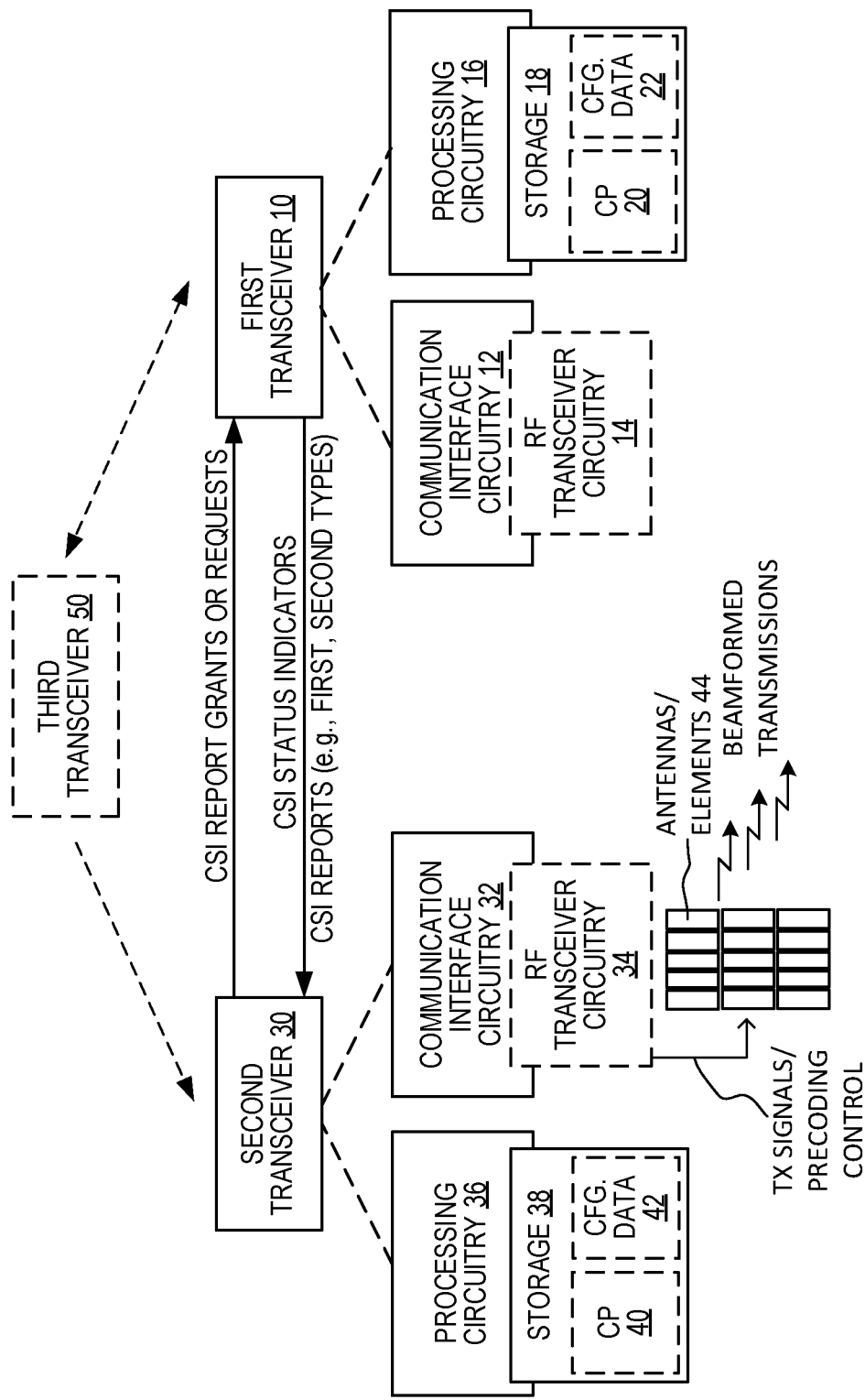
FIG. 1 is a block diagram of one embodiment of a first transceiver configured to provide Channel State Information (CSI) status indicators.

FIG. 1 illustrates an example embodiment of a first transceiver 10 that includes communication interface circuitry 12 that comprises or otherwise includes radio frequency, RF, transceiver circuitry 14. The first transceiver 10 further includes processing circuitry 16 that is operatively associated with the communication interface circuitry 12. In at least some embodiments, the processing circuitry 16 includes or is associated with storage 18, which may be used for storing a computer program 20 and one or more items of configuration data 22.

FIG. 1 also illustrates an example embodiment of a second transceiver 30 that includes communication interface circuitry 32 that comprises or otherwise includes RF transceiver circuitry 34. The second transceiver 30 further includes processing circuitry 36 that is operatively associated with the communication interface circuitry 32. In at least some embodiments, the processing circuitry 36 includes or is associated with storage 38, e.g., for storing a computer program 40 and one or more items of configuration data 42.

FIG. 1 also illustrates that a further or third transceiver 50 may be present. For example, as a non-limiting example, the second transceiver 30 comprises a base station, access point, or other radio network node operating in the radio access portion of a wireless communication network, and the first transceiver comprises a User Equipment, UE, or other wireless device or apparatus configured for connecting to the network via the air interface provided by the second transceiver 30. In this context, the first transceiver 10 receives downlink signals from the second transceiver 30 and transmits uplink signals to the second transceiver 30. Additionally, or in the alternative, the second transceiver 30 receives downlink signals from the third transceiver 50 and/or transmits uplink signals to the third transceiver 50. As a non-limiting example to provide context for such possibilities, the third transceiver 50 comprises a low-power base station that provides network coverage in an area overlapped by, or adjacent to, a larger coverage area provided by the second transceiver 30 operating as a high power base station.

In this context, and in other contexts, the second transceiver 30 includes or is associated with multiple antennas 44, e.g., a "set" of antennas that it can use for beamforming transmissions toward the first transceiver 10. As a general proposition, the first transceiver 10 provides Channel State Information, CSI, feedback to the second transceiver 30, either directly or as forwarded through the third transceiver 50.

Of particular interest herein, the transceiver circuitry 14 is configured to transmit and receive radio signals, e.g., to/from the second transceiver 30. Correspondingly, the processing circuitry 16 is configured to generate a CSI status indictor in dependence on a status of CSI generation at the first transceiver 10 with respect to a channel between the first transceiver 10 and the second transceiver 30, which beamforms at least some types of transmissions toward the first transceiver 10. The processing circuitry 16 is further configured to transmit, via the transceiver circuitry 14, the CSI status indicator and to receive, via the transceiver circuitry 14, a transmission grant or request in response to the CSI status indicator. Further, the processing circuitry 16 is configured to transmit, via the transceiver circuitry 14, a CSI report in response to the transmission grant or request.

In at least some embodiments the processing circuitry 16 is configured to generate the CSI status indicator to indicate an amount of CSI available at the first transceiver 10.

In the same or other embodiments, the processing circuitry 16 is configured to generate the CSI status indicator to indicate that new CSI is available for transmission from the first transceiver 10.

Additionally, or in the alternative, the processing circuitry 16 is configured to generate the CSI status indicator to indicate a number and type of CSI reports available for transmission from the first transceiver 10.

In one or more embodiments, the processing circuitry 16 is configured to generate the CSI status indicator to indicate that CSI previously reported by the first transceiver 10 is out of date.

In the same or other embodiments, the processing circuitry 16 is configured to generate the CSI status indicator to indicate that a beamforming matrix update is needed at the second transceiver 30 with respect to beamforming toward the first transceiver 10.

In any one or more of the above examples, the processing circuitry 16 may "generate" the CSI status indicator by setting a value or logical flag maintained by it, to reflect the state or status of relevant CSI generation. The first transceiver 10 would then provide the CSI status indicator by including its value in a transmitted message, or by including an Information Element, IE, or other field, flag, or value in the message that indicates the CSI status.

In at least one example, the first transceiver 10 is configured to use two CSI reporting processes, including a first CSI reporting process to report on a beamformed channel between the first and second transceivers 10, 30, and including a second CSI reporting process to report on a full channel between the first and second transceivers 10, 30. Here, the processing circuitry 16 is configured to generate the CSI status indicator in dependence on CSI generated for the second CSI reporting process.

As regards the "channel" between the first and second transceivers 10 and 30, it will be appreciated that the channel can be considered both with respect to beamformed transmissions and/or with respect to non-beamformed transmissions. For example, in at least one embodiment, the processing circuitry 16 is configured to generate CSI with respect to a full dimension of the channel, based on the first transceiver 10 receiving non-beamformed, per-antenna reference signals from a set of antennas 44 used by the second transceiver 30 for beamforming toward the first transceiver 10, and to generate the CSI status indictor with respect to the CSI generated for the full dimension of the channel. Such CSI may be referred to as "full-channel CSI".

As a further example, the first transceiver 10 is configured to generate first and second types of CSI reports. The first type of CSI report provides CSI for a beamformed channel between the first and second transceivers 10 and 30, and the second type of CSI report provides CSI for a full dimension of the channel without beamforming. Correspondingly, the processing circuitry 16 is configured to generate the CSI status indicator in dependence on generating CSI for the second type of CSI report.

As noted, the number of "ports" used by the second transceiver 30 for transmitting to the first transceiver 10 may be viewed as the number of CSI reference signals distinguishable at the first transceiver 10 with respect to transmissions from the second transceiver 30. Hence, the number of ports determines the "dimension" of the observable channel. For "full-dimension" CSI reporting, the number of ports equals the number of transmit antennas 44.

Consequently, the processing circuitry 16 in such an example embodiment can be understood as generating the first type of CSI report for the channel as it effectively appears during beamforming and in dependence on receiving reference signals that are beamformed according to beamforming matrix information currently being used by the second transceiver 30 for beamforming towards the first transceiver 10. The processing circuitry 16 in this example case can be understood further as generating the second type of CSI report for the channel according to its full dimension, in dependence on receiving non-beamformed, antenna-specific reference signals from each antenna 44 used by the second transceiver 30 for beamforming toward the first transceiver 10.

In at least one such embodiment, the processing circuitry 16 is configured to send CSI reports of the first type on a regular reporting basis and send CSI reports of the second type in dependence on transmitting corresponding CSI status indicators and receiving corresponding transmission grants or requests. For example, the second transceiver 30 may send a message or other signaling to the first transceiver 10 that serves as an explicit request for the first transceiver 10 to send the second type of CSI report. The second transceiver 30 may generate the request in response to monitoring one or more aspects of longer-term communication performance involving the first transceiver 10, such as communication error rates. Of course, it is contemplated herein that the second transceiver 30 may use an alternative basis, or use additional bases, for determining when to send such requests. For example, the second transceiver 30 may send the request once the first transceiver 10 indicates that the second type of CSI report is available.

In another embodiment, or as part of any preceding embodiment, the processing circuitry 16 is configured to receive the transmission grant or request from a third transceiver 50 that is communicatively associated with the second transceiver 30, and to transmit the CSI report to the third transceiver 50, thereby enabling forwarding of the CSI report to the second transceiver 30. Such operation may apply where the second and third transceivers 30 and 50 are neighboring base stations, e.g., where the third transceiver 50 operates as a hotspot of coverage extending or enhancing base station relative to the second transceiver 30.

It will be appreciated that the communication interface circuitry 12/32 comprises physical layer circuitry and any associated control, power, and processing circuitry, as needed for communicating over one or more mediums. The processing circuitry 16/36 in at least some embodiments comprises one or more microprocessors, digital signal processors, Field Programmable Gate Arrays, Application Specific Integrated Circuits, or other digital processing circuits that are specially adapted to carry out the processing operations detailed herein.

The processing circuitry 16/36 in one or more embodiments is configured based at least in part on executing program instructions of the computer program 20/40. Correspondingly, the storage 18/38 comprises one or more types of computer-readable media that provide non-transitory storage for the computer programs 20/40. Here, "non-transitory" does not necessarily mean permanent or unchanging, but does mean storage of at least some persistence. For example, the storage 18/38 comprises a mix of long-term storage used for non-volatile retention of the computer program 20/40, and working memory for program execution. Non-limiting examples include any one or more of disk storage, FLASH, EEPROM, SRAM, and DRAM.

More generally, the processing circuitry 16/36 comprises fixed circuitry or programmed circuitry, or a mix of fixed and programmed circuitry. It shall also be understood that the architecture and circuitry of the first transceiver 10 may differ substantially from the architecture and circuitry of the second transceiver 30, or from the architecture and circuitry of the third transceiver 50. For example, in some scenarios the first transceiver 10 is a User Equipment, UE, or other wireless device or apparatus designed for mobile operation within a wireless communication network and second transceiver 30 is a base station configured for operation in such a network. Correspondingly, the first transceiver 10 will be lower power and less complex than the second transceiver 30, and the second transceiver 30 may have pools or collections of circuitry for supporting communications with a plurality of wireless devices.

Figure 2:
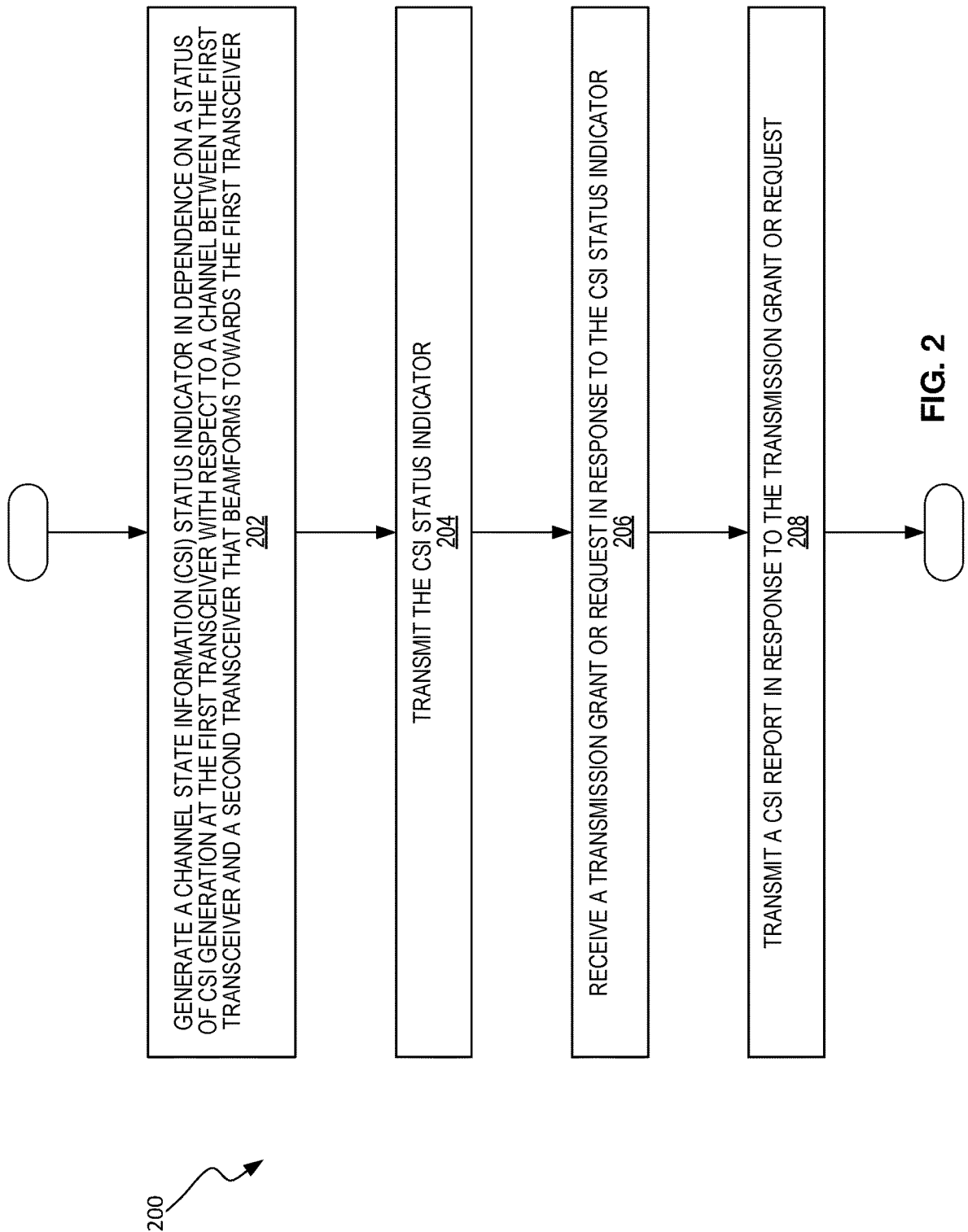
FIG. 2 is a logic flow diagram of one embodiment of a method of providing CSI status indicators.

FIG. 2 illustrates one embodiment of a method 200 contemplated herein. It will be appreciated that one or more steps of the method 200 may be performed by a first transceiver 10 in an order other than that suggested by the flow diagram. Further, it shall be appreciated that all or part of the method 200 can be performed by the first transceiver 10 on a repeating or looped basis and/or on a triggered basis, and that at least some of the illustrated steps or operations underlying them may be performed on an ongoing or background basis. Finally, it should be appreciated that implementation or performance of the method 200 by a first transceiver 10 is not limited to the particular arrangement of the circuitry shown for the first transceiver 10 in the example of FIG. 1.

The depicted embodiment of the method 200 includes generating (Block 202) a CSI status indictor in dependence on a status of CSI generation at the first transceiver 10 with respect to a channel between the first transceiver 10 and a second transceiver 30 that beamforms toward the first transceiver 10. The method 200 further includes transmitting (Block 204) the CSI status indicator, receiving (Block 206) a transmission grant or request in response to the CSI status indicator, and transmitting (Block 208) a CSI report in response to the transmission grant or request.

In an example embodiment or instance, the first transceiver 10 generates and regularly reports CSI corresponding to its receipt of beamformed transmissions from the second transceiver 30. Over a potentially longer period, the first transceiver 10 receives non-beamformed reference signals for the full dimension of the channel between it and the second transceiver 30 and it generates full-channel CSI, e.g., a corresponding beamforming matrix representing the beamforming weights or coefficients to be used for beamforming toward the first transceiver 10. As another example, the full-channel CSI comprises a quantized channel matrix for the full channel. Such processing may be based on performing an Eigenvalue decomposition, and it will be appreciated that the full-channel CSI may be lengthy and may require significant time to generate, at least in comparison to reporting quantized information such as CQI, PMI, RI, etc.

Advantageously, then, the first transceiver 10 generates a CSI status indicator in dependence on its generation of the full-channel CSI. The CSI status indicator indicates any one or more of (1) the availability of full-channel CSI, the amount of full-channel CSI, and the state or nature of the full-channel CSI. As for the "state" or "nature", in an example embodiment, the first transceiver 10 determines whether the full-channel CSI most recently reported is out of date with respect to the latest full-channel CSI generated by the first transceiver 10. For example, it may evaluate the degree of correspondence between the last-reported and the most-recently-generated full-channel CSI and use the CSI status indicator to indicate whether or not the last-reported information is out of date.

FIGS. 3A and 3B provide example details in the context of a wireless communication network 60, such as a cellular communication network based on Third Generation Partnership Project, 3GPP, specifications.

According to the example of FIG. 3A, the network includes a Radio Access Network or RAN 62, and a Core Network or CN 64 that includes any number of nodes, such as a Mobility Management Entity or MME 66, a Serving Gateway or SGW 68, and other supporting nodes 70. The RAN 62 includes a number of base station 72, e.g., 72-1 and 72-2, that provide "cells" 74-1 and 74-2. Each cell 74-1 or 74-2 may be understood as corresponding to particular radio resources used to provide coverage in a corresponding geographic area. The base stations 72-1 and 72-2 support various UEs or other wireless devices 80, e.g., 80-1, 80-2, and 80-3.

The reference number "80" without suffixing may be used in the singular and plural senses to refer to one or more wireless devices, e.g., "device 80" and "devices 80". Similarly, the reference number "72" without suffixing may be used in the singular and plural senses to refer to one or more base stations, e.g., "base station 72" and "base stations 72". With such notation in mind, each wireless device 80 communicatively couples to the RAN 62 according to the air interface defined by the network 60. Each wireless device 80 receives downlink signals 76 from one or more base stations 72 in the network 60 and transmits uplink signals 78 to one or more base stations in the network 60.

In the context of FIG. 3A, any given one of the wireless devices 80-1, 80-2, and 80-3 may be understood as being the first transceiver 10 described above. Correspondingly, a given one of the base stations 72-1 and 72-2 may be understood as being the second transceiver 30 described above. As a specific example, the wireless device 80-1 operates as the first transceiver 10 and the base station 72-1 operates as the second transceiver 30.

Whereas FIG. 3A suggests a scenario where the two base stations 72-1 and 72-2 provide comparably-sized cells 74-1 and 74-2, the base stations 72 and cells 74 may not be homogeneous in terms of type, capability, or coverage area. FIG. 3B in particular, it can be understood as an example where a first base station 72-1 operates as macro or high-power base station and provides coverage in a first cell 74-1 that may be regarded as a macro cell. A second base station 72-2 operates as a pico or low-power base station and provides coverage in a second cell 72-2 that may be regarded as a pico cell.

In one example involving the arrangement depicted in FIG. 3B, the wireless device 80 operates as the first transceiver 10 described above, the first base station 72-1 operates as the second transceiver 30 described above, and the second base station 72-2 operates as the third transceiver 50 described above.

FIG. 3B may involve a multi-connectivity scenario where the wireless device 80 is connected to both of the first and second base stations 72-1 and 72-2, although the two base stations 72 may have substantially different transmit power levels or capabilities. In one scenario, the wireless device 80 shown in FIG. 3B receives control and data in the downlink from both the first and second base stations 72-1 and 72-2. However, in an example scenario, only the second base station 72-2 receives uplink control and data from the wireless device 80. Optionally, some control data is received by the first base station 72-1 from the wireless device 80, such as ACK/NACK feedback and/or the CSI report status indicators at issue herein. Uplink transmissions towards the first base station 72-1 are more expensive than transmissions towards the second base station 72-2 in this example, because the wireless device 80 is closer to the second base station 72-2 and needs less uplink transmit power to transmit to it.

At least some CSI reports used by the first base station 72-1 are not transmitted directly to the first base station 72-1 by the wireless device 80. Instead, the wireless device 80 transmits at least some reports to the second base station 72-2, and the second base station 72-2 forwards those reports to the first base station 72-1. Because the precise amount of CSI available in the wireless device 80 at any given time may be unknown to the second base station 72-2, absent teachings herein, the second base station 72-2 would need to over-provision one or more uplink grants to the wireless device 80 for reporting or risk that not all of the CSI to be reported will fit into the grant.

However, in at least one embodiment, the wireless device 80 advantageously uses the CSI status indicator to solve this problem. In particular, the wireless device 80 uses the CSI status indicator to indicate the amount of CSI available for transmission. The second base station 72-2 may then, based on the CSI status indicator, transmit an uplink grant to the wireless device 80 that is suitable to fit both the available CSI information and any user data to be transmitted from the wireless device 80 in conjunction with sending the CSI information.

An additional factor in the multi-connectivity example is that the CSI for a connection toward the first base station 72-1 can change due to CSI procedures involving the second base station 72-2. For example, the second base station 72-2 schedules CSI measurements and precoder selection toward the wireless device 80, where such precoder selections change the interference situation at the wireless device 80. Hence, the "best" precoder selection for the first base station 72-1 needs to be updated. In at least some embodiments, the wireless device 80 uses its CSI status indicator to indicate such need to the first base station 72-1.

In more detail, when the second base station 72-2 changes its beamforming towards the wireless device 80, the interference situation at the wireless device 80 with respect to the first base station 72-1 changes. Consequently, beamforming performed by the first base station 72-1 towards the wireless device 80 may need to change. The wireless device 80 can use the CSI status indicator to indicate that such changes are needed.

In another example which does not necessarily involve multi-connectivity, a wireless device 80 or other apparatus operating as the first transceiver 10 uses its CSI status indicator to indicate the need for the second transceiver 30 to update the beamforming matrix used by the second transceiver 30 for beamforming toward the first transceiver 10. For example, the first transceiver 10 is configured with two types of CSI processes. The first type of CSI process is used to obtain "normal" CSI reports from the first transceiver 10 consisting of any one or more of RI, CQI and PMI. The first transceiver 10 determines these values by receiving and evaluating beamformed CSI-RS having p ports. The second type of CSI process is used to determine the beamforming that should be used for the beamformed CSI-RS. The second type of CSI process is based on the first transceiver 10 receiving and evaluating non-beamformed, full-dimension CSI-RS.

The beamforming feedback constituting the CSI feedback for the second CSI process may be determined by the first transceiver 10 using a Singular Value Decomposition, SVD, of the full channel between it and the second transceiver 30. In such calculations, p columns of the right-singular vectors are used as the beamforming matrix. The beamforming matrix calculated by the first transceiver 10 has dimension n×p, where n is the number of transmit antennas. Hence, if the number of transmit antennas is large, the reporting of the beamforming matrix consumes significant uplink resources and the first transceiver 10 advantageously uses its CSI status indicator to indicate when such information is available for transmission to the second transceiver 30 and/or to indicate the amount of such information or whether such information needs to be sent.

For example, the first transceiver 10 receives the non-beamformed CSI-RS for the full channel between it and the second transceiver 30, calculates an updated beamforming matrix or related values, and compares the updated information to the previously reported information. In response to determining that there is more than a threshold difference between the updated information the last-reported information, the first transceiver 10 transmits a CSI status indicator indicating to the second transceiver 30 that a more accurate beamforming is available.

In a non-limiting case, the first transceiver 10 is configured to send the CSI status indicator responsive to detecting that the angular direction of the non-beamformed CSI-RS has changed by some threshold amount with respect to its last determination of full-channel information. For example, the first transceiver 10 may be configured to detect when it changes from a line-of-sight radio environment to a non-line-of-sight radio environment or vice versa.

Another aspect of the teachings herein involves "best efforts" CSI processing. The first transceiver 10 in some embodiments may have limited or scarce processing resources available to it for the computation of full-channel CSI, either as a consequence of its design or the particular operating scenario—e.g., resources may be scarce when the first transceiver 10 is operating in dual-connectivity. Resource limitations can delay or extend the time needed by the first transceiver 10 to determine or update the full-channel CSI. In particular, even in the best of scenarios, iterative methods for SVD have variable times to convergence. In any such case or scenario, the first transceiver 10 can use its CSI status indicator to signal when it has finished its latest round of full-channel CSI processing.

As for transmission of the CSI status indicator, various approaches are contemplated herein. In some embodiments, the first transceiver 10 includes the CSI status indicator in Uplink Control Information or UCI, and may transmit it along with providing downlink Hybrid Automatic Repeat reQuest, HARQ, feedback to the second transceiver 30. In other embodiments, the CSI status indicator may be included in a MAC control element. The indicator may be transmitted periodically or aperiodically. For aperiodic transmission, the transmission may be triggered by configured events. The configured events may be defined by the configuration data 22 stored in the first transceiver 10, where such information may be provisioned or pre-stored in the first transceiver and/or signaled to it by the second transceiver 30 or another node.

Example events include "recommended rank has changed" and/or "New MCS is an offset larger/lower than previous reported MCS". Here, "MCS" denotes Modulation and Coding Scheme, and such event triggers may also be configured for periodic transmission of the CSI status indicator. In such cases, the event triggers may control the value of the CSI status indicator. Consider the following non-limiting examples: CSI status indicator equal to "0" indicates "No need for CSI update" and CSI status indicator equal to "1" indicates "One or more event triggers indicate the need for a CSI update".

The CSI status indicator may also be embedded in a table entry of another information field. Assume for example that the first transceiver is configured to send a coarse periodic CSI report on a physical uplink control channel such as the PUCCH, and to sends detailed CSI reports on demand, on a physical uplink shared data channel such as the PUSCH. The coarse CSI report may consist of a small number of bits, e.g. 10 bits providing 1024 possible CSI reporting values. One of those, e.g. 0000000000, may be reserved for indicating that a new detailed CSI report is available, i.e. the "CSI status indicator" may be encoded in a table entry.

The CSI status indicator contemplated herein provides a number of advantages, such as by providing an efficient mechanism for a first transceiver 10 to inform a second transceiver 30 that certain channel parameters have changed enough to make a new CSI report valuable. Additionally, or alternatively, the CSI status indicator provides a mechanism for indicating the amount of CSI information available for reporting, which allows more efficient allocation of reporting resources. Still further, the CSI status indicator may be used to indicate that it is time to re-train the beamforming used on the CSI antenna ports. This avoids the need for costly periodic re-training solutions which often will have no positive effect on communication performance.

Figure 4:
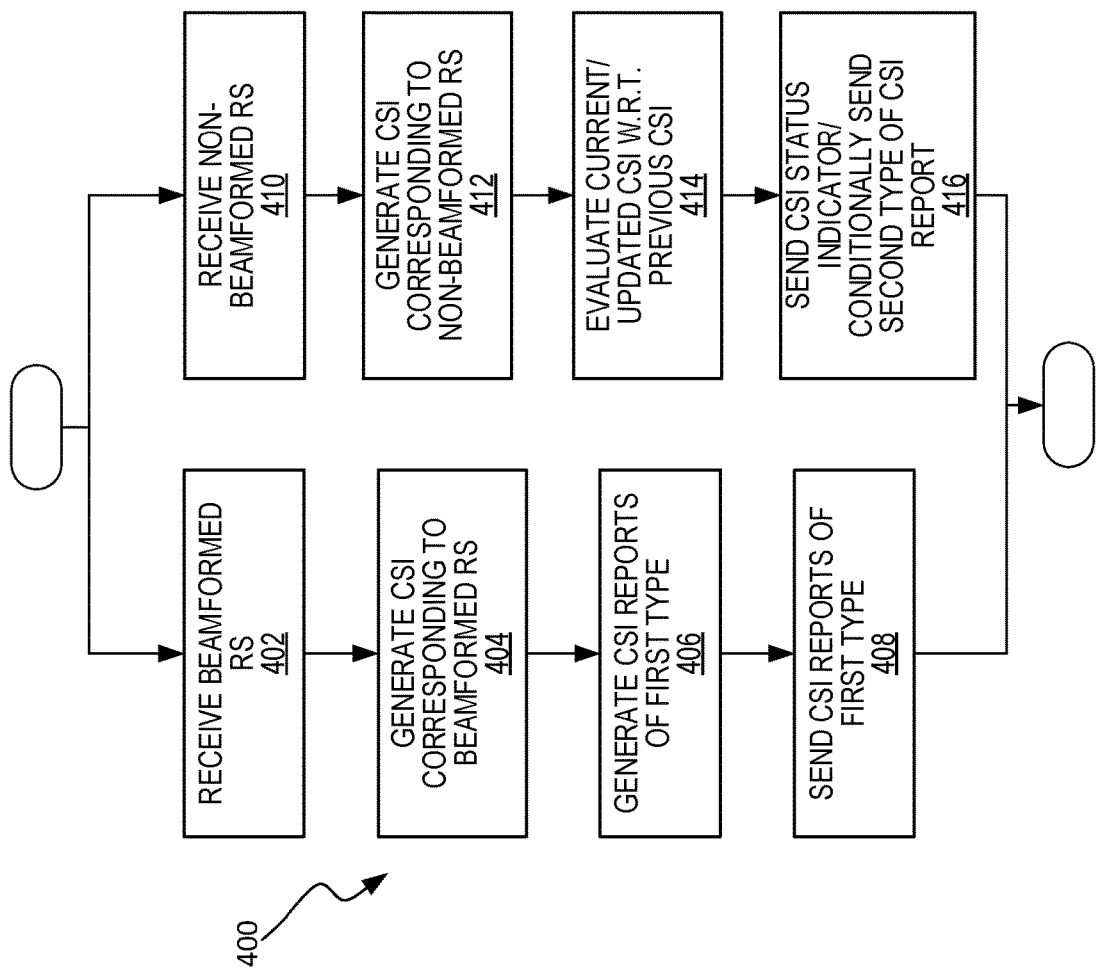
FIG. 4 is a logic flow diagram of example details for the method depicted in FIG. 2.

FIG. 4 illustrates another method 400, which may be a further embodiment or which may be viewed as a more detailed example of the method 200 introduced in FIG. 2. The method 400 includes a left branch and a right branch, which may be performed in parallel, but which may correspond to different time frames, e.g., the left-branch processing may be done or repeated on a first time interval, while the right-branch processing may be done or repeated on a longer, second time interval.

The method 400 includes the first transceiver 10 receiving beamformed reference symbols or signals, denoted as "RS" (Block 402), and generating CSI corresponding to the beamformed RS. The method 400 further includes generating (Block 406) CSI reports of a first type that comprise CSI related to the beamformed RS, such as CQI, PMI, and RI values, and sending (Block 408) CSI reports of the first type.

Additionally, the method 400 includes the first transceiver 10 receiving non-beamformed RS (Block 410), e.g., receiving a non-beamformed RS from each antenna 44 used by a second transceiver 30 for beamforming toward the first transceiver 10. The non-beamformed RS provide, for example, the first transceiver 10 with a basis for determining full-dimension CSI towards the second transceiver 30.

The method 400 further includes generating (Block 412) CSI corresponding to the non-beamformed RS, evaluating (Block 414) current CSI with respect to previous CSI, and sending (Block 416) a CSI status indicator and, conditionally, sending a CSI report of the second type. Here, the "current CSI" shall be understood as the most recently calculated CSI corresponding to the non-beamformed RS, while the "previous" CSI shall be understood as the CSI last reported for the non-beamformed RS. The CSI status indicator may be used to indicate whether the current CSI is changed sufficiently with respect to the previous CSI to warrant sending a new CSI report of the second type, and such a report may be sent if/when the first transceiver 10 receives a transmission request or grant.

Figure 5:
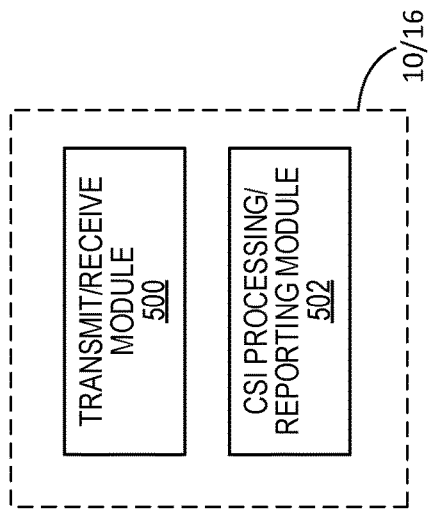
FIG. 5 is a block diagram of one embodiment of processing modules that may be implemented in a transceiver for generating and providing CSI status indicators.

FIG. 5 illustrates a number of "modules" corresponding to functional realizations, e.g., within the processing circuitry 16 of the first transceiver 10, where such modules may be configured to carry out any of the above embodiments. In the illustrated example, the first transceiver 10/processing circuitry 16 includes one or more transmit/receive modules 500 configured for receiving signals and transmitting signals, and one or more CSI processing/reporting modules 502. The CSI processing/reporting modules 502 are configured to generate a CSI status indictor in dependence on a status of CSI generation at the first transceiver 10 with respect to a channel between the first transceiver 10 and a second transceiver 30 that beamforms toward the first transceiver 10, transmit the CSI status indicator, receive a transmission grant or request in response to the CSI status indicator, and transmit a CSI report in response to the transmission grant or request.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method at a first transceiver, comprising:
generating a Channel State Information (CSI) status indicator in dependence on a status of CSI generation at the first transceiver with respect to a channel between the first transceiver and a second transceiver that beamforms toward the first transceiver;
transmitting the CSI status indicator;
receiving a transmission grant or request in response to the CSI status indicator; and
transmitting a CSI report in response to the transmission grant or request;
wherein generating the CSI status indicator comprises generating the CSI status indicator to indicate that a beamforming matrix update is needed with respect to beamforming toward the first transceiver.

2. The method of claim 1, wherein the first transceiver uses two CSI reporting processes, including a first CSI reporting process to report on a beamformed channel between the first and second transceivers, and including a second CSI reporting process to report on a full channel between the first and second transceivers, and wherein generating the CSI status indicator comprises generating the CSI status indicator in dependence on CSI generated for the second CSI reporting process.

3. The method of claim 1, wherein the method further comprises generating CSI with respect to a full dimension of the channel, based on the first transceiver receiving non-beamformed, per-antenna reference signals from a set of antennas used by the second transceiver for beamforming toward the first transceiver, and wherein generating the CSI status indicator comprises generating the CSI indicator with respect to the CSI generated for the full dimension of the channel.

4. The method of claim 1, wherein the method further comprises generating first and second types of CSI reports, wherein the first type of CSI report provides CSI for a beamformed channel between the first and second transceivers and the second type of CSI report provides CSI for a full dimension of the channel between the first and second transceivers, without beamforming, and wherein the method includes generating the CSI status indicator in dependence on generating CSI for the second type of CSI report.

5. The method of claim 4, wherein the method comprises sending CSI reports of the first type on a regular reporting basis and sending CSI reports of the second type in dependence on transmitting corresponding CSI status indicators and receiving corresponding transmission grants or requests.

6. The method of claim 1, wherein receiving the transmission grant or request comprises receiving the transmission grant or request from a third transceiver that is communicatively associated with the second transceiver, and wherein transmitting the CSI report comprises transmitting the CSI report to the third transceiver, thereby enabling forwarding of the CSI report to the second transceiver.

7. A first transceiver comprising:
transceiver circuitry configured to transmit and receive radio signals;
processing circuitry operatively associated with the transceiver circuitry and configured to:
generate a Channel State Information (CSI) status indicator in dependence on a status of CSI generation at the first transceiver with respect to a channel between the first transceiver and a second transceiver that beamforms toward the first transceiver;
transmit, via the transceiver circuitry, the CSI status indicator;
receive, via the transceiver circuitry, a transmission grant or request in response to the CSI status indicator; and
transmit, via the transceiver circuitry, a CSI report in response to the transmission grant or request;
wherein the processing circuitry is configured to generate the CSI status indicator to indicate that a beamforming matrix update is needed with respect to beamforming toward the first transceiver.

8. The first transceiver of claim 7, wherein the first transceiver is configured to use two CSI reporting processes, including a first CSI reporting process to report on a beamformed channel between the first and second transceivers, and including a second CSI reporting process to report on a full channel between the first and second transceivers, and wherein the processing circuitry is configured to generate the CSI status indicator in dependence on CSI generated for the second CSI reporting process.

9. The first transceiver of claim 7, wherein the processing circuitry is configured to generate CSI with respect to a full dimension of the channel, based on the first transceiver receiving non-beamformed, per-antenna reference signals from a set of antennas used by the second transceiver for beamforming toward the first transceiver, and to generate the CSI status indicator with respect to the CSI generated for the full dimension of the channel.

10. The first transceiver of claim 7, wherein the first transceiver is configured to generate first and second types of CSI reports, wherein the first type of CSI report provides CSI for a beamformed channel between the first and second transceivers and the second type of CSI report provides CSI for a full dimension of the channel between the first and second transceivers, without beamforming, and wherein the processing circuitry is configured to generate the CSI status indicator in dependence on generating CSI for the second type of CSI report.

* * * * *